(12) United States Patent
West et al.

(10) Patent No.: US 8,316,632 B2
(45) Date of Patent: Nov. 27, 2012

(54) THRUST REVERSER CONFIGURATION FOR A SHORT FAN DUCT

(75) Inventors: Randall R. West, Wichita, KS (US); Henry A. Schaefer, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 947 days.

(21) Appl. No.: 12/392,303

(22) Filed: Feb. 25, 2009

(65) Prior Publication Data
US 2010/0212286 A1   Aug. 26, 2010

(51) Int. Cl.
*F02K 99/00* (2009.01)

(52) U.S. Cl. .................................................... 60/226.2

(58) Field of Classification Search ........ 60/226.1–226.3, 60/230, 262; 244/110 B; 239/265.19, 265.27, 239/265.29, 265.31, 265.37
See application file for complete search history.

(56) References Cited

U.S. PATENT DOCUMENTS

| | | | |
|---|---|---|---|
| 3,153,321 A | 10/1964 | Spears, Jr. | |
| 3,280,562 A | 10/1966 | Theits et al. | |
| 3,500,644 A * | 3/1970 | Hom et al. | 60/229 |
| 3,500,646 A * | 3/1970 | Hom et al. | 60/229 |
| 3,503,211 A | 3/1970 | Medawar et al. | |
| 3,599,432 A | 8/1971 | Ellis | |
| 3,779,010 A * | 12/1973 | Chamay et al. | 60/226.2 |
| 3,824,784 A | 7/1974 | Kitson et al. | |
| 3,831,376 A | 8/1974 | Moorehead | |
| 4,005,822 A | 2/1977 | Timms | |
| 4,185,798 A | 1/1980 | Dickenson | |
| 4,407,120 A | 10/1983 | Timms | |
| 4,716,724 A | 1/1988 | Newton | |
| 4,778,110 A | 10/1988 | Sankey et al. | |
| 4,807,434 A * | 2/1989 | Jurich | 60/226.2 |
| 4,922,713 A | 5/1990 | Barbarin et al. | |
| 4,998,409 A * | 3/1991 | Mutch | 60/226.2 |
| 5,655,360 A * | 8/1997 | Butler | 60/226.2 |
| 5,806,302 A * | 9/1998 | Cariola et al. | 60/204 |
| 5,915,651 A | 6/1999 | Asaki et al. | |
| 6,000,216 A * | 12/1999 | Vauchel | 60/226.2 |
| 6,151,883 A * | 11/2000 | Hatrick et al. | 60/226.2 |
| 6,170,254 B1 * | 1/2001 | Cariola | 60/226.2 |
| 6,256,980 B1 | 7/2001 | Lecordix et al. | |
| 6,474,059 B2 | 11/2002 | Stretton | |
| 7,484,356 B1 * | 2/2009 | Lair | 60/226.2 |
| 7,559,507 B2 * | 7/2009 | Harrison et al. | 244/110 B |
| 2008/0135679 A1 | 6/2008 | Udall | |
| 2009/0151320 A1 | 6/2009 | Sternberger | |

FOREIGN PATENT DOCUMENTS

| | | |
|---|---|---|
| EP | 1004766 A1 | 5/2000 |
| EP | 1921007 A2 | 5/2008 |

* cited by examiner

*Primary Examiner* — Phutthiwat Wongwian
(74) *Attorney, Agent, or Firm* — Hovey Williams LLP

(57) ABSTRACT

A thrust reverser comprises a translating sleeve, a torque beam, a plurality of cascades, a plurality of blocker doors, and a plurality of actuators. The translating sleeve is positioned at the rear of an aircraft nacelle and is translated rearward during thrust reverser deployment. The torque beam is positioned within the nacelle and configured to prevent airflow into the nacelle during thrust reverser deployment. The plurality of cascades are positioned around the circumference of the torque beam during thrust reverser stowage and are translated rearward during thrust reverser deployment. The plurality of blocker doors are positioned in alignment with the plurality of cascades and direct airflow through the plurality of cascades during thrust reverser deployment. The plurality of actuators are coupled to the forward edge of the sleeve and configured to translate the sleeve rearward during thrust reverser deployment.

24 Claims, 8 Drawing Sheets

THRUST REVERSER CONFIGURATION FOR A SHORT FAN DUCT

BACKGROUND OF THE INVENTION

1. Field of the Invention

Embodiments of the present invention relate to aircraft engine thrust reversers. More particularly, embodiments of the present invention relate to cascade thrust reversers for use with an aircraft engine with a short fan duct.

2. Description of the Related Art

Many commercial jet aircraft include turbofan jet engines as the main source of propulsion. This type of engine includes a nacelle that surrounds an intake fan and a turbine engine. The intake fan brings air into the engine and a portion of the airstream enters the turbine engine, which is combusted to provide thrust. The rest of the airstream bypasses the turbine engine and flows through a fan duct that surrounds the turbine engine within the nacelle. The airstream exiting the fan duct also provides thrust.

The engine may also include a thrust reverser to provide reverse thrust during landing in order to slow the aircraft when the aircraft is on the ground. A turbofan jet engine often includes a cascade-type thrust reverser. The cascade thrust reverser typically includes a plurality of cascades that are positioned around the circumference of the interior of the nacelle along the path of the fan duct. When the thrust reverser is deployed, a portion of the nacelle is translated rearward, typically by actuators, to expose the cascades. Roughly at the same time, a plurality of blocker doors that are located on the interior of the nacelle along the path of the fan duct are positioned to block the path of the air flowing along the fan duct and divert it through the cascades, which provides reverse thrust.

It is desirable to reduce the aerodynamic drag on the engine as well as the weight of the engine, which in turn reduces the fuel consumption and increases the range of the aircraft. One way to do this is to shorten the length of the fan duct and in turn, the nacelle, which reduces the surface area and the weight of the engine. However, the components of the thrust reverser (e.g., cascades, actuators, etc.) generally require a certain length to perform to a desired specification. Once this specification is determined, the nacelle and fan duct must then be positioned around these components. Simply reducing the size of the components to fit within a shortened fan duct length leads to diminished or altered performance of the thrust reverser as well as possibly impacting the operating stability of the turbofan jet engine.

SUMMARY OF THE INVENTION

Embodiments of the present invention solve the above-mentioned problems and provide a distinct advance in the art of aircraft engine thrust reversers. More particularly, embodiments of the invention provide a cascade thrust reverser for use with an aircraft engine with a short fan duct.

In various embodiments of the present invention, the thrust reverser comprises a translating sleeve, a torque beam, a plurality of cascades, a plurality of blocker doors, and a plurality of actuators. The translating sleeve may be positioned at the rear of an aircraft nacelle when the thrust reverser is stowed and may be translated rearward during thrust reverser deployment.

The torque beam may be positioned within the nacelle to provide structural support to other members of the nacelle. The torque beam may be configured to prevent airflow into the nacelle during thrust reverser deployment.

The cascades may be positioned along a flat outer band around the circumference of the torque beam during thrust reverser stowage. The cascades may be coupled to the forward edge of the translating sleeve and are translated rearward during thrust reverser deployment.

The blocker doors may be positioned in alignment with the plurality of cascades. The blocker doors may be coupled with the forward edge of the translating sleeve and when the thrust reverser is stowed, the blocker doors may lie flat against the interior of the translating sleeve. When the thrust reverser is deployed, the blocker doors may rotate inward and direct airflow through the cascades.

The actuators are coupled to the forward edge of the translating sleeve. The actuators may translate the sleeve rearward during thrust reverser deployment.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
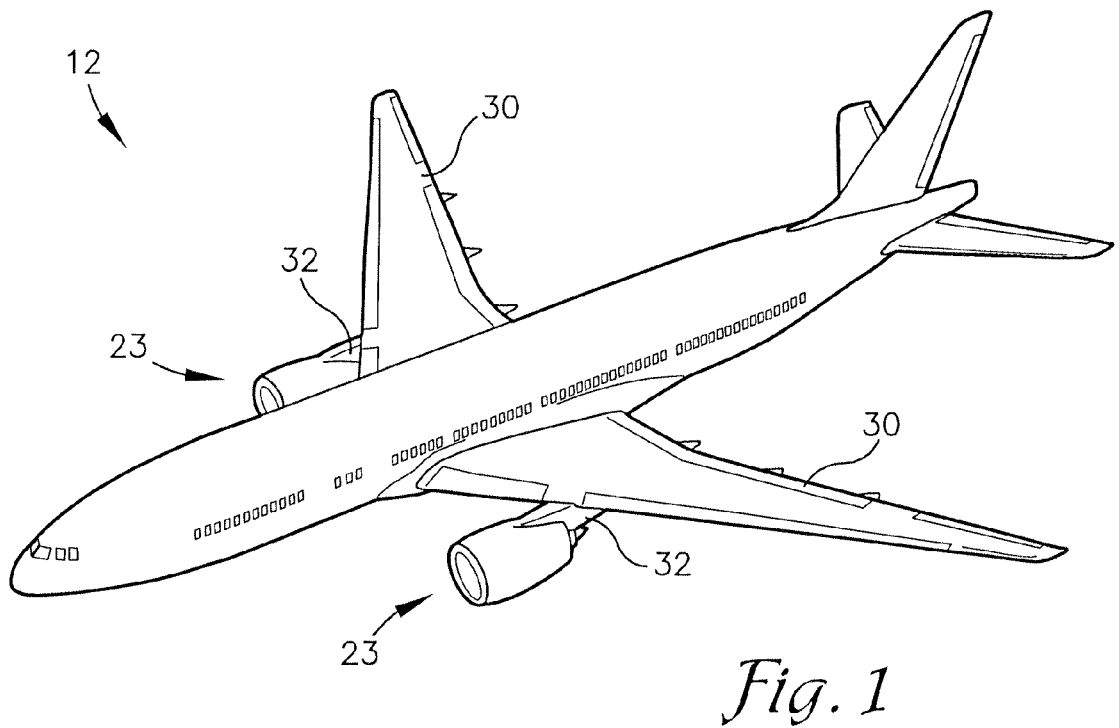
FIG. 1 is a perspective view of an aircraft that includes a thrust reverser for a short fan duct as constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A thrust reverser 10 constructed in accordance with various embodiments of the current invention is shown in FIGS. 1-8. The thrust reverser 10, when deployed, provides reverse thrust for an aircraft 12 while the aircraft 12 is landing. However, during takeoff, and when in flight, the thrust reverser 10 is stowed to prevent interference with the propulsion of the aircraft 12. As best illustrated in FIGS. 3-6, the thrust reverser 10 broadly comprises a translating sleeve 14, a plurality of cascades 16, a plurality of blocker doors 18, a torque beam 20, and a plurality of actuators 22, as discussed in more detail below. The thrust reverser 10 is generally utilized as a component of an aircraft engine 23, which also includes a nacelle 24, an intake fan 26, and a turbine engine (not shown in the figures), which is encased in a shell forming the innermost flow surface or inner wall 28. The aircraft engine 23 may be a high-bypass or a low-bypass turbofan type. The nacelle 24 surrounds the intake fan 26 and at least a portion of the inner wall 28 and may have a tapered-cylindrical or barrel shape. The engine 23 is coupled to an aircraft wing 30 through a pylon 32, which attaches to the upper central region along the longitudinal axis of the engine 23.

Figure 3:
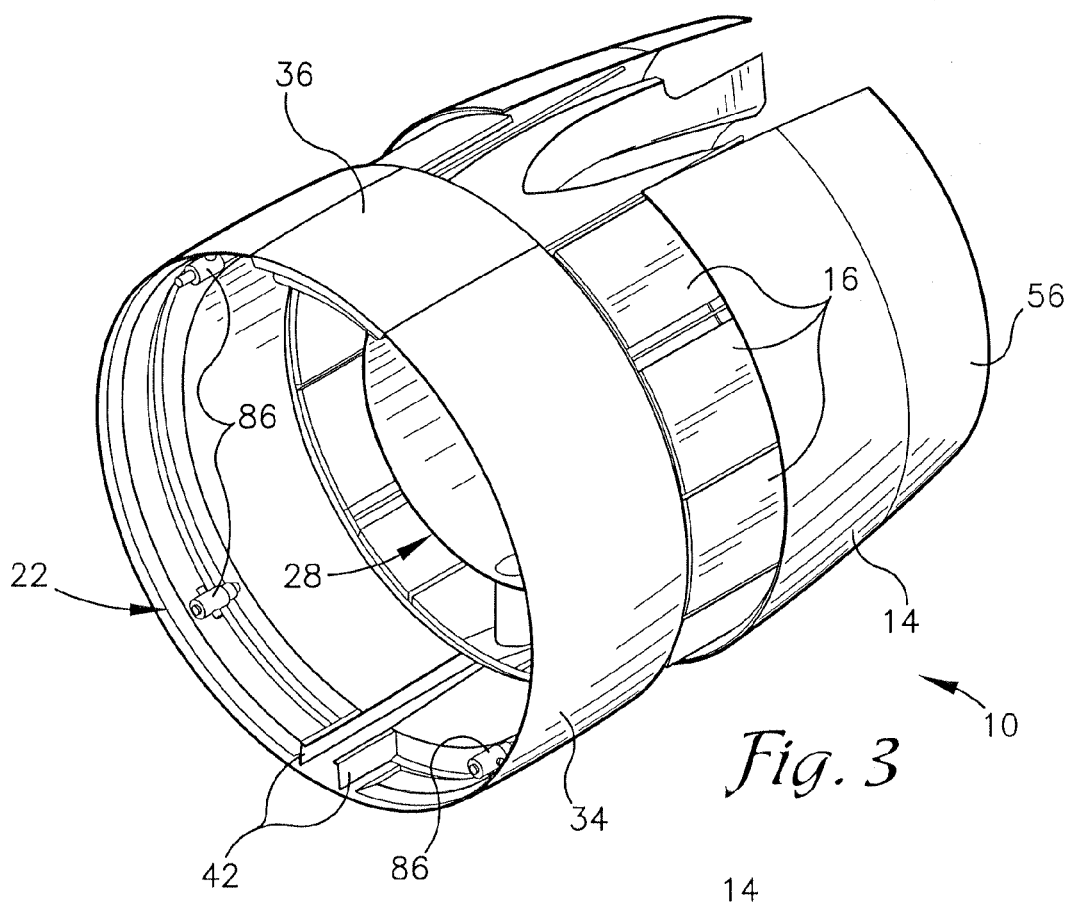
FIG. 3 is a perspective view of an aircraft nacelle with the thrust reverser in the deployed position.

The nacelle 24 may also include a fan cowl 34, an upper, central support structure 36, a fan case 38, an upper beam structure 40, a lower beam structure 42, an upper slider track 44, and a lower slider track 46. The fan cowl 34 may be generally arcuate in shape with a length along a portion of the longitudinal axis of the nacelle 24 and may be positioned at the front of the exterior of the nacelle 24. The relative positional terms "front" or "forward" and "rear" or "aft" maintain their traditional meanings when referencing aircraft engines. Front and forward refer to the portion of the engine 23 where air intake occurs. Rear and aft refer to the portion of the engine 23 where air exhaust occurs. The fan cowl 34 may include two or more sections as shown in FIG. 3, or the fan cowl 34 may be of single monolithic construction. The fan cowl 34 may generally occupy a large percentage of the circumference of the nacelle 24.

The support structure 36 may have a generally rectangular outer surface area with an arcuate shape across its width, wherein the width of the support structure 36 corresponds to the width of the pylon 32. The length of the support structure 36 corresponds to the length of the fan cowl 34. The fan cowl 34 couples with the support structure 36 in the upper central region at the front of the nacelle 24. The fan case 38 may be located at the front portion of the nacelle 24 on the interior of the fan cowl 34 and the support structure 36 and may directly surround the fan 26. The fan case 38 may extend along the length of the interior of the nacelle 24 and abut the rear edge of the fan case 38 with an outwardly flaring fan ramp 48.

The upper beam structure 40 and the lower beam structure 42 generally provide support along the length of the nacelle 24. Both the upper beam structure 40 and the lower beam structure 42 are elongated, narrow, and extend the entire length of the nacelle 24. There may be a first and second upper beam structure 40, wherein the first and second upper beam structures 40 couple to opposing sides of the support structure 36 and the pylon 32 along the longitudinal axis of the nacelle 24. The first and second upper beam structures 40 may also connect to the fan cowl 34, as well as various portions of the thrust reverser 10, as discussed below. In addition, there may be a first and second lower beam structure 42, wherein the first and second lower beam structures 42 couple to each other along the lower central axis of the nacelle 24. The first and second lower beam structures 42 may also connect to the fan cowl 34, as well as various portions of the thrust reverser 10, as discussed below.

The upper slider track 44 and the lower slider track 46 generally allow the translating sleeve 14 to slide rearward during deployment of the thrust reverser 10. The upper slider track 44 and the lower slider track 46 may be elongated, narrow, and extend along a portion of the nacelle 24. There may be a first and second upper slider track 44 that couple with the first and second upper beam structure 40, respectively. In addition, there may be a first and second lower slider track 46 that couple with the first and second lower beam structure 42, respectively.

Figure 4:
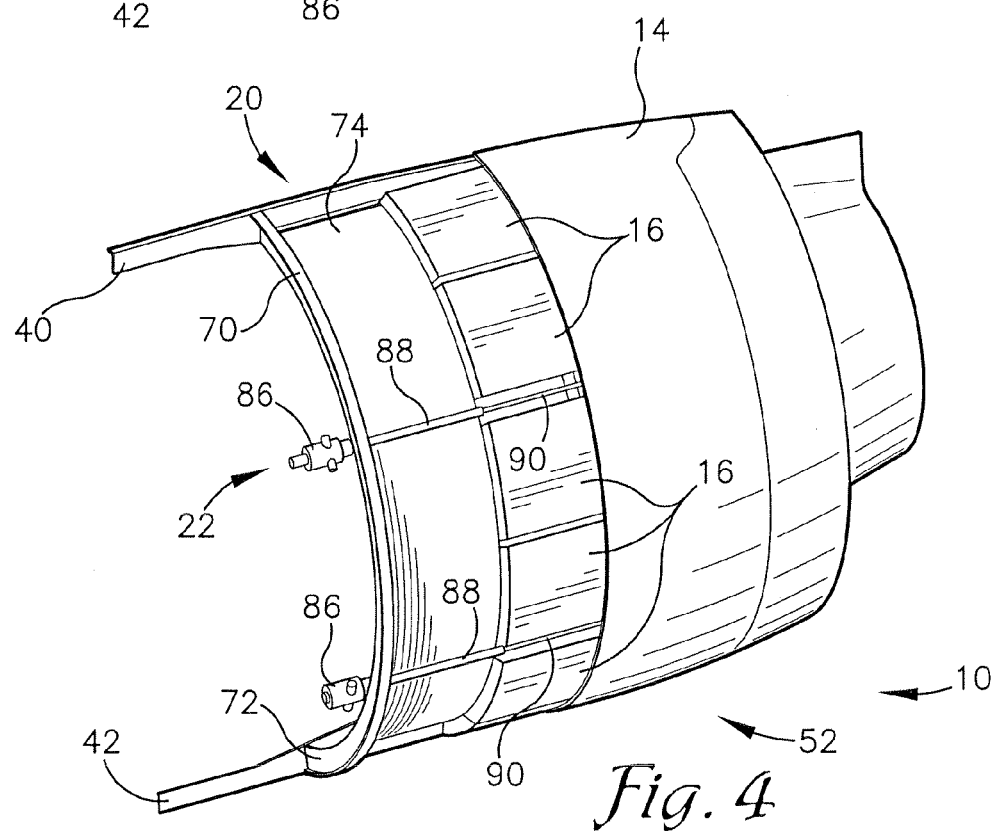
FIG. 4 is a perspective view of a left-hand portion of the aircraft nacelle with a fan cowl removed and the thrust reverser in the deployed position.
Figure 5:
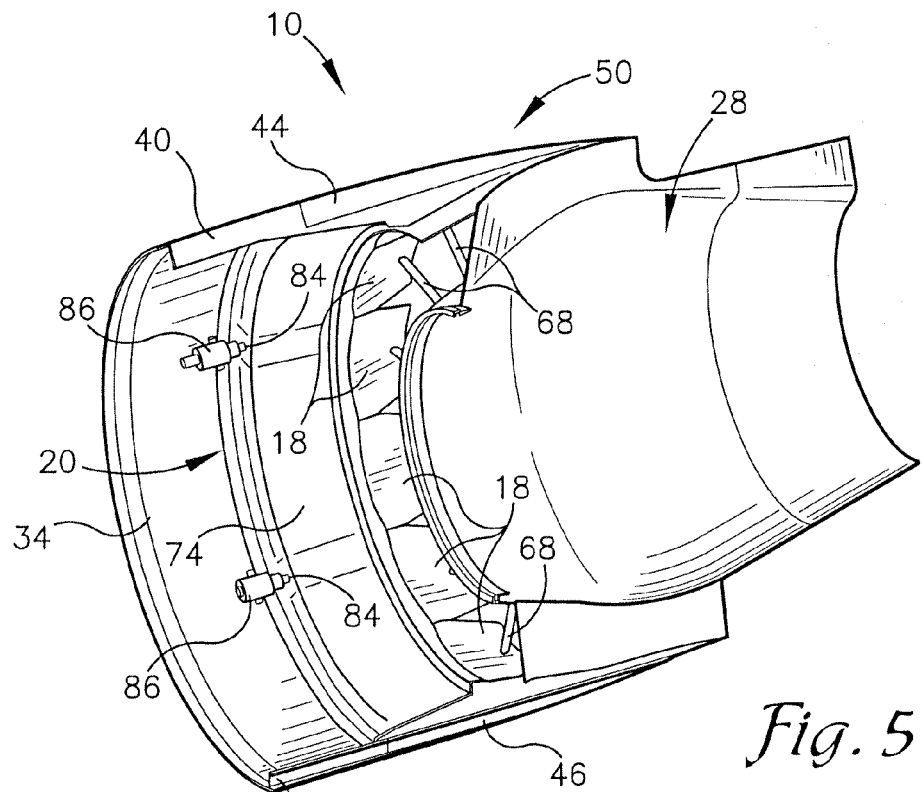
FIG. 5 is a perspective view of a right-hand portion of the aircraft nacelle with the thrust reverser in the stowed position.
Figure 6:
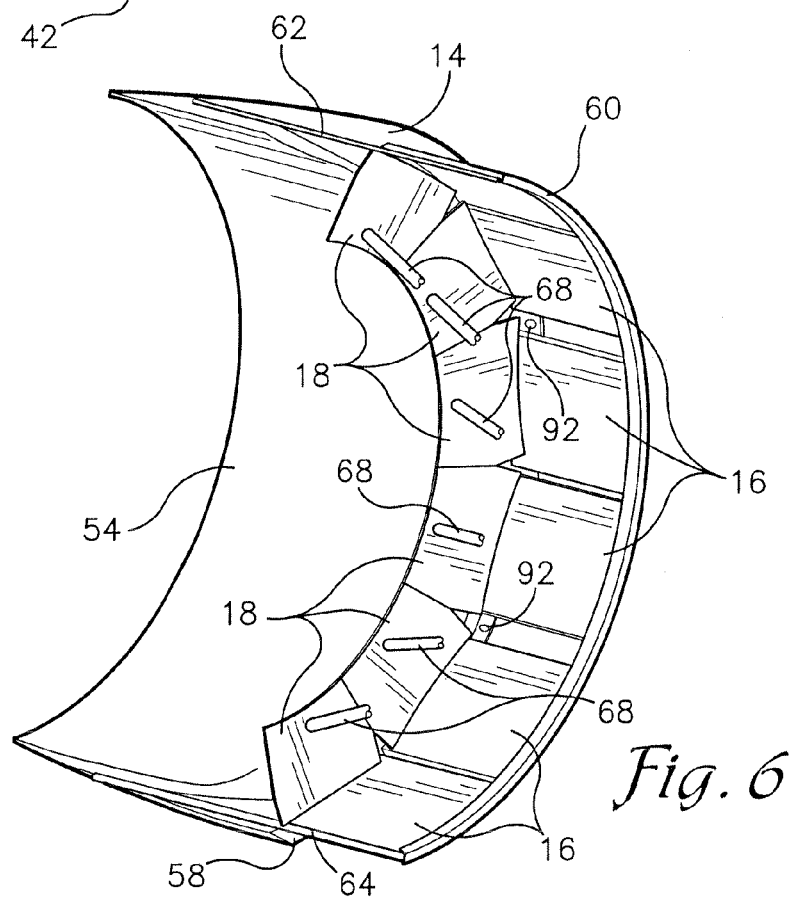
FIG. 6 is a perspective view of the interior of the left-hand portion of the thrust reverser in the deployed position showing a plurality of blocker doors.

In various embodiments, the thrust reverser 10 may include a right-hand reverser 50 and a left-hand reverser 52 that are formed by a vertical plane through the longitudinal axis of the nacelle 24, as seen in FIGS. 4-6. The left-hand reverser 52 and the right-hand reverser 50 may attach to one another along the bottom central line of the nacelle 24. Along the top of the nacelle 24, the nacelle 24 connects to the pylon 32. Thus, there may be a gap between the right-hand reverser 50 and the left-hand reverser 52 along the top of the nacelle 24.

The translating sleeve 14 is generally moved rearward when the thrust reverser 10 is deployed in order to expose a path for the reverse thrust. The translating sleeve 14 may be generally arcuate in shape with a center of curvature that aligns with the longitudinal axis of the nacelle 24. The translating sleeve 14 may include an inner surface 54 and an outer surface 56. The inner surface 54 generally faces inward to the aircraft engine 23 and may include acoustic panel or other material for sound damping of the noise output of the engine 23. The outer surface 56 of the translating sleeve 14 may include an outer cowl 58. The outer cowl 58 generally aligns with the fan cowl 34 along the circumference of the nacelle 24, such that the forward edge of the outer cowl 58 abuts the rear edge of the fan cowl 34 when the thrust reverser 10 is stowed. The forward edge of the inner surface 54 of the translating sleeve 14 may abut the fan ramp 48 when the thrust reverser 10 is stowed. In various embodiments, the translating sleeve 14 may include a left portion and a right portion as shown in FIGS. 4-6.

The cascades 16 generally aim or direct the flow of air as it passes from the interior of the nacelle 24 to the exterior of the nacelle 24 during the deployment of the thrust reverser 10. In various embodiments, the thrust reverser 10 may include six cascades 16 for the left-hand reverser 52 and six cascades 16 for the right-hand reverser 50, as seen in FIGS. 4 and 6. In general, however, there may be a plurality of cascades 16 positioned around the circumference of the thrust reverser 10. The exact number of cascades 16 may depend on a variety of design and manufacturing considerations.

Each cascade 16 is generally rectangular in surface area and arcuate along its thickness, such that one cascade 16 may be positioned next to another cascade 16 along the circumference of the thrust reverser 10 and the curvature of the nacelle 24 is maintained. However, there may also be a space between certain adjacent cascades 16 to allow room for the actuators 22 to couple with the translating sleeve 14. Each cascade 16, as is known in the art, may include a plurality of air-flow openings that are arranged generally in a grid pattern which direct the flow of air through the cascade 16 in a forward direction, which helps to provide reverse thrust. The forward end of the cascades 16 may be coupled to a forward support ring 60, which is generally arcuate in shape and aligns with the circumference of the thrust reverser 10. The rear end of the cascades 16 is coupled with the translating sleeve 14.

The nacelle 24 may further include an upper slider 62 and a lower slider 64 that engage the upper slider track 44 and the lower slider track 46, respectively. The upper slider 62 may include a first and second upper slider 62 that engages the first and second upper slider track 44, respectively, while the lower slider 64 may include a first and second lower slider 64 that engages the first and second lower slider track 46, respectively. The upper slider 62 may correspond in length to the upper slider track 44, while the lower slider 64 may correspond in length to the lower slider track 46. The upper slider 62 may couple to the upper edge of the translating sleeve 14, one or more cascades 16, and a portion of the forward support ring 60. The lower slider 64 may couple to the lower edge of the translating sleeve 14, one or more cascades 16, and a portion of the forward support ring 60.

Figure 7:
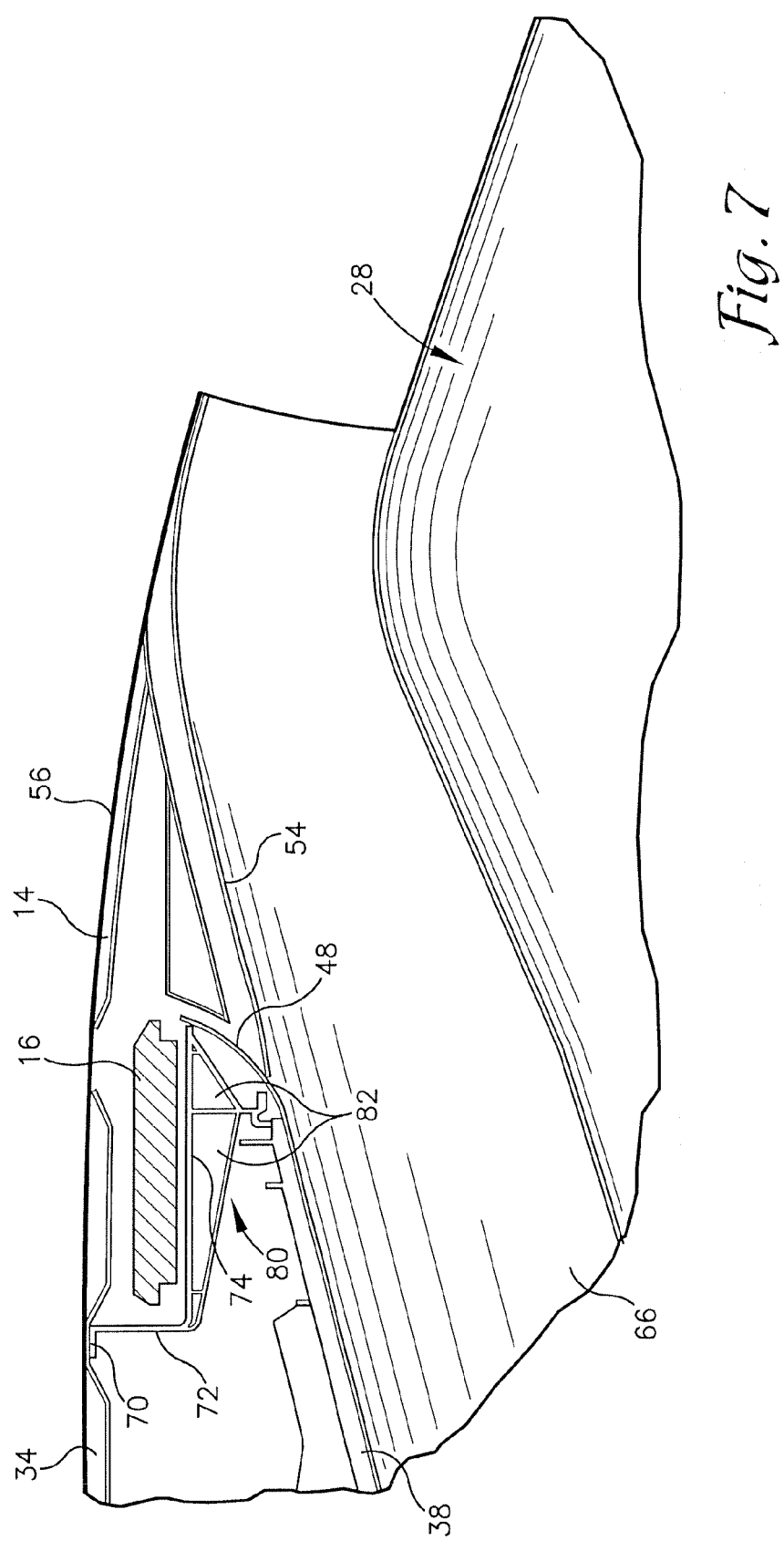
FIG. 7 is a sectional view of the thrust reverser in the stowed position cut along a vertical plane through the longitudinal axis of the aircraft engine.
Figure 8:
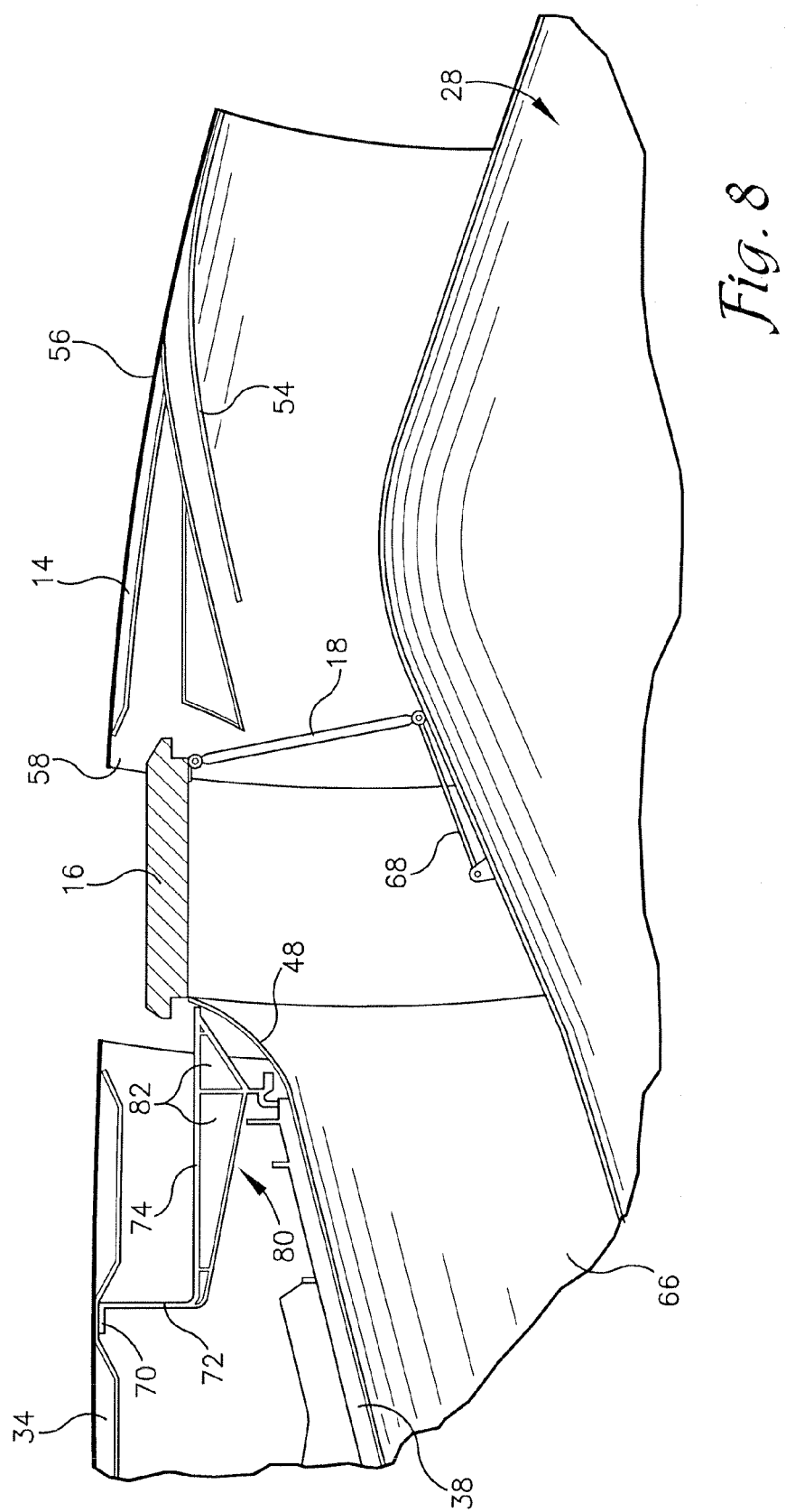
FIG. 8 is a sectional view of the thrust reverser in the deployed position cut along a vertical plane through the longitudinal axis of the aircraft engine.
Figure 9:
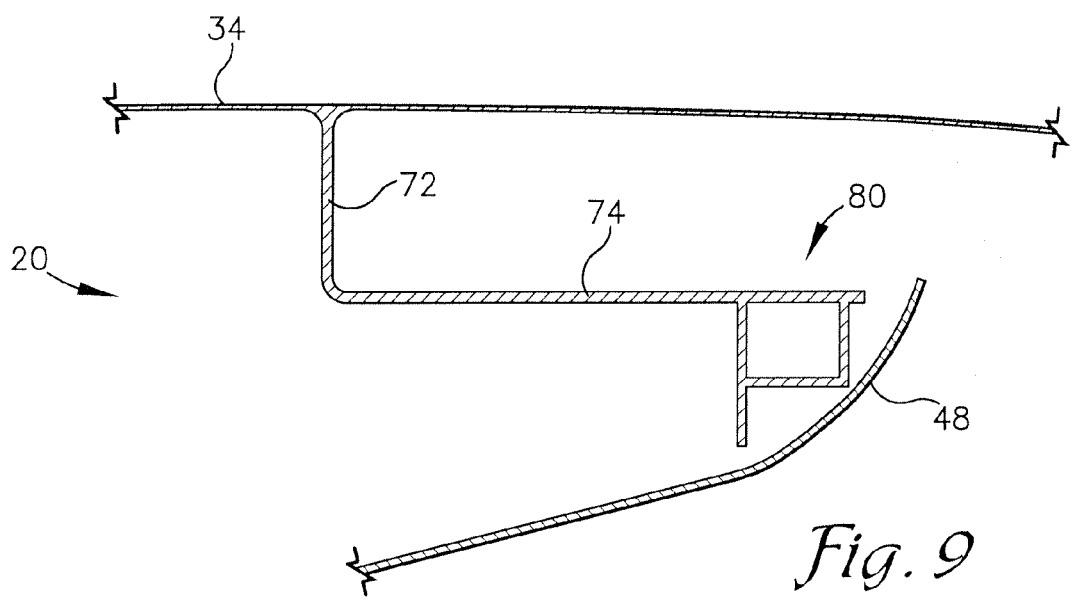
FIG. 9 is a sectional view of a first alternate embodiment of a torque beam.
Figure 10:
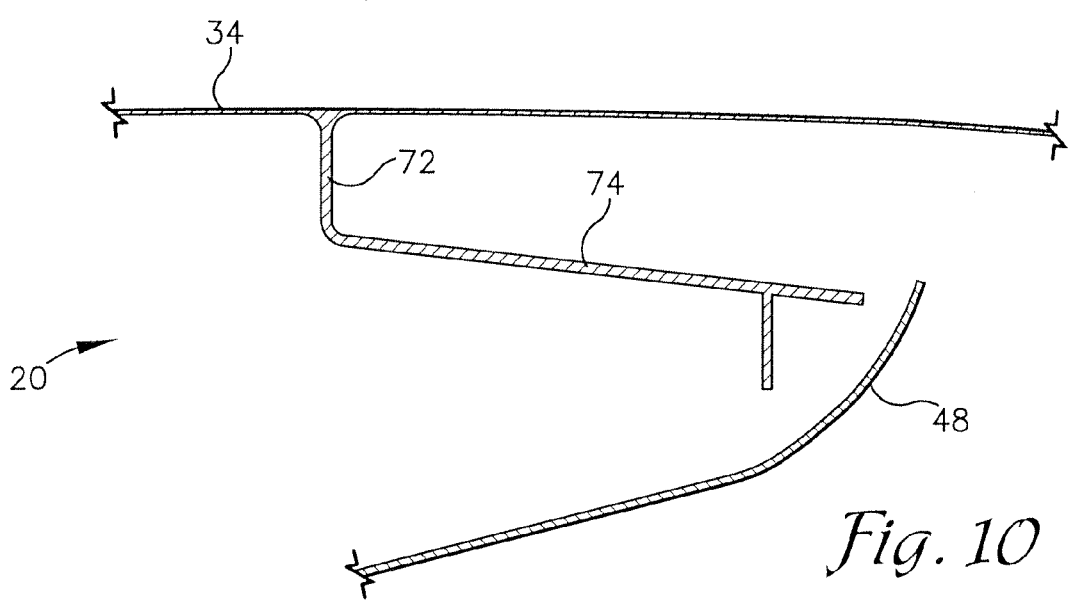
FIG. 10 is a sectional view of a second alternate embodiment of the torque beam.
Figure 11:
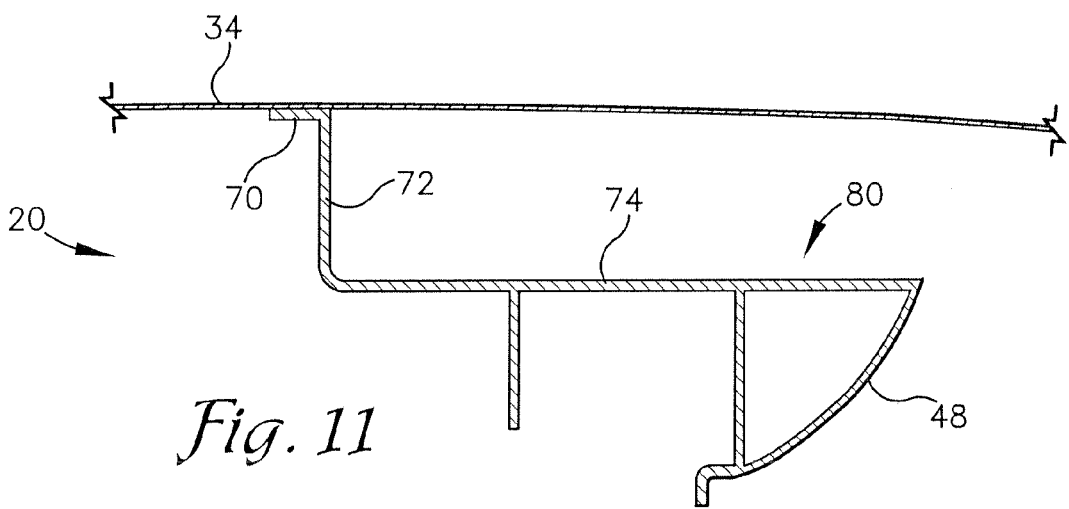
FIG. 11 is a sectional view of a third alternate embodiment of the torque beam.
Figure 12:
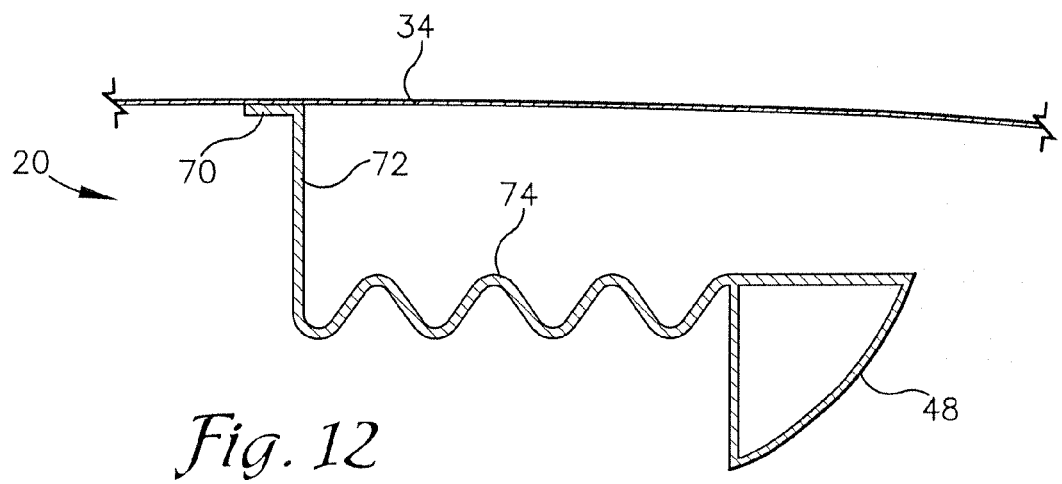
FIG. 12 is a sectional view of a fourth alternate embodiment of the torque beam.
Figure 13:
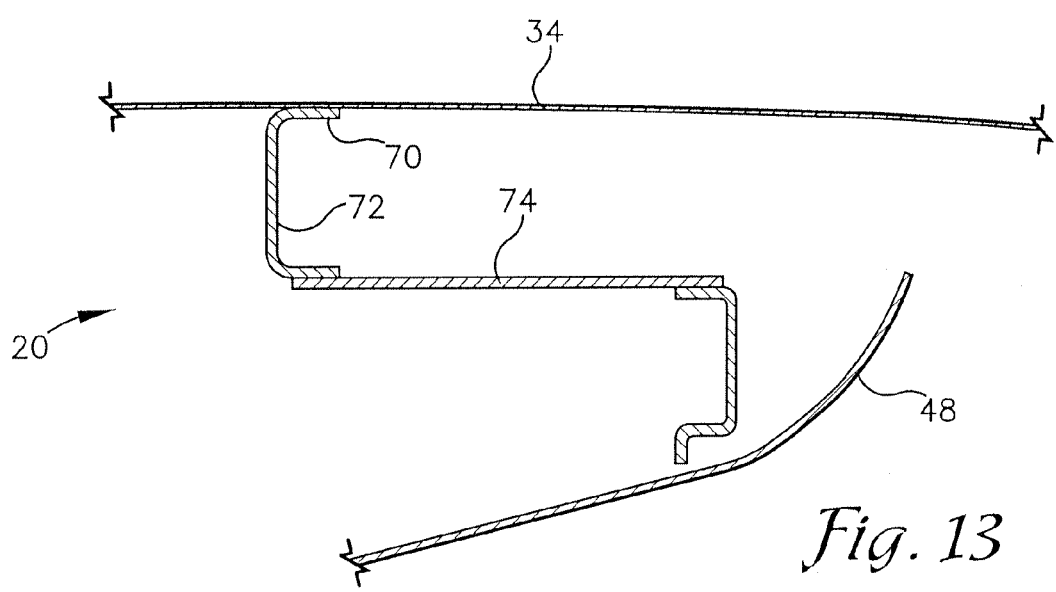
FIG. 13 is a sectional view of a fifth alternate embodiment of the torque beam.
Figure 14:
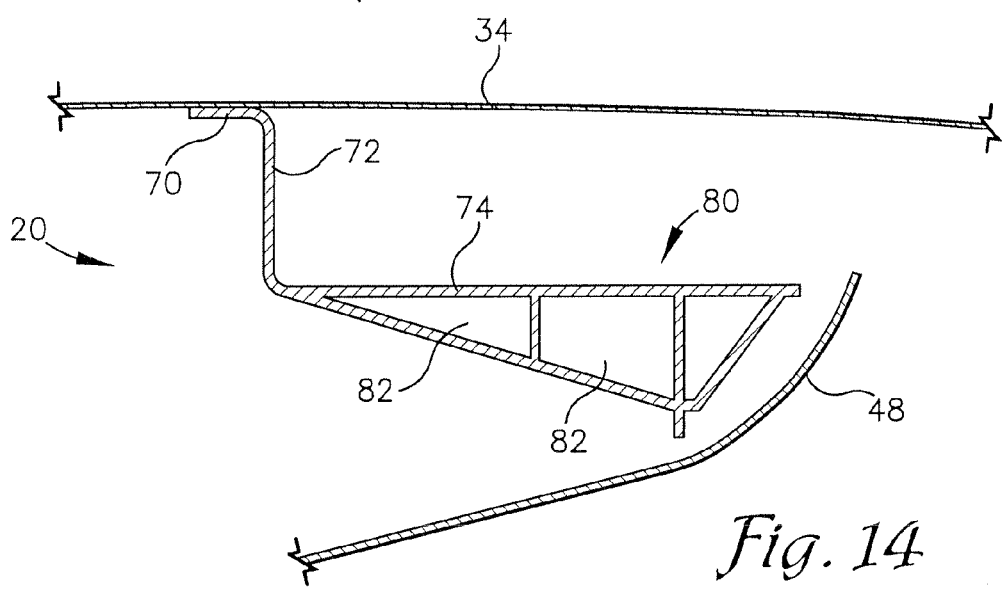
FIG. 14 is a sectional view of a sixth alternate embodiment of the torque beam.
Figure 15:
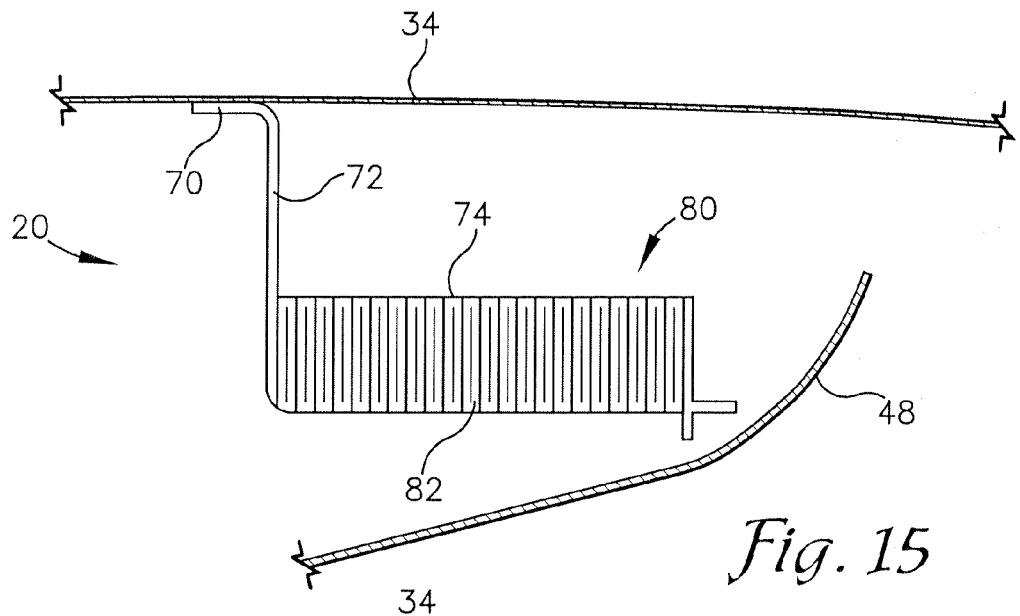
FIG. 15 is a sectional view of a seventh alternate embodiment of the torque beam.
Figure 16:
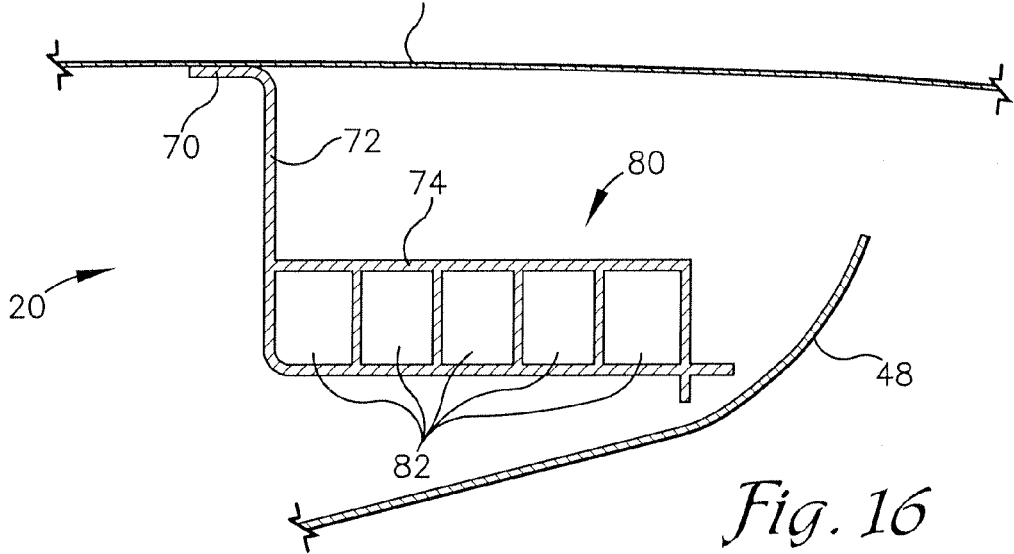
FIG. 16 is a sectional view of a eighth alternate embodiment of the torque beam.

A fan duct 66 may be formed along a lengthwise path between the interior of the nacelle 24 and the exterior of the inner wall 28, as seen in FIGS. 7-8. The interior of the nacelle 24 may be defined by the inner surface of the fan case 38 and the inner surface 54 of the translating sleeve 14. Air generally enters the engine 23 and flows through the fan 26. A portion of the air flows into and through the turbine engine. The rest of the air flows into the fan duct 66, which passes around the inner wall 28 and exits at the rear of the nacelle 24.

The blocker doors 18 generally prohibit air from flowing from the fan 26 along the fan duct 66 to the rear of the nacelle 24 during deployment of the thrust reverser 10. In various embodiments, the thrust reverser 10 may include six blocker doors 18 for the left-hand reverser 52 and six blocker doors 18 for the right-hand reverser 50, as seen in FIGS. 5-6. The twelve blocker doors 18 may generally align with the twelve cascades 16, as described above. The number of blocker doors 18 may vary based on the diameter of the fan duct 66 and the kinematic motion of the doors 18 during deployment.

Each blocker door 18 is roughly trapezoidal, or at least a portion of the blocker door 18 is trapezoidal, in surface area, while the blocker door 18 is curved along its thickness. The sides of the blocker door 18 are tapered inward and the base of the blocker door 18 is rotatably attached to the forward edge of the inner surface 54 of the translating sleeve 14. When the thrust reverser 10 is stowed, the blocker doors 18 lie flat against the inner surface 54 of the translating sleeve 14. When the thrust reverser 10 is deployed, the blocker doors 18 are pulled into a blocking position along the fan duct 66, shown in FIGS. 6 and 8. Since the sides of the blocker doors 18 are tapered, when the blocker doors 18 are pulled into the blocking position the side of one blocker door 18 abuts the side of an adjacent blocker door 18 to effectively block the path down the fan duct 66 and redirect airflow from the fan 26 through the cascades 16.

Each blocker door 18 is coupled to the inner wall 28 with a blocker door drag link 68. The drag link 68 is generally elongated and relatively thin for its length. One end of the drag link 68 may be rotatably attached to the inner surface of the blocker door 18 near the aft end of the longitudinal axis of the blocker door 18. The other end of the drag link 68 may be rotatably attached toward the forward end of the inner wall 28.

The torque beam 20 generally provides structural support between the upper beam structure 40 and the lower beam structure 42, as well as a compartment for the cascades 16 during thrust reverser 10 stowage. One particular embodiment of the torque beam is shown in FIGS. 4-5 and 7-8. Alternate embodiments of the torque beam are shown in FIGS. 9-16. The torque beam 20 is generally arcuate in shape and is positioned along the circumference of the nacelle 24 at the aft edge of the fan cowl 34. Several embodiments of the torque beam 20 (see FIGS. 7-8, 11-12, 14-16) may include a forward-pointing flange 70 at its forward edge which couples to the fan cowl 34. In other embodiments (see FIGS. 9-10), the torque beam 20 may be integrally formed with the fan cowl 34.

In various embodiments (see FIGS. 7-8, 11-12, 14-16), coupled to the aft end of the flange 70 is an inwardly-extending, radially-aligned ring 72. In some embodiments (see FIGS. 9-10), the ring 72 may integrally extend inward from the fan cowl 34. In at least one embodiment (see FIG. 13), the ring 72 may include three generally orthogonally-positioned planar walls, such that the ring 72 may have a roughly C-shaped cross section. The upper wall of the ring 72 may be coupled to the fan cowl 34. The lower wall of the ring 72 may couple with a flat outer band 74 that axially extends to form a cavity between the flat outer band 74 and the fan cowl 34.

Figure 17:
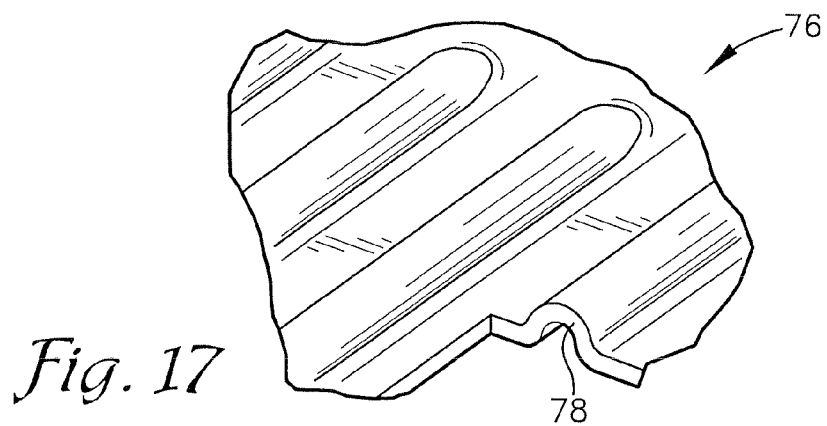
FIG. 17 is a perspective view of a material used in constructing a portion of the torque beam.

In various other embodiments (see FIGS. 7-12, 14-16), the ring 72 may be integrally formed with the outer band 74. Generally, the outer band 74 extends rearward from the ring 72. In at least one embodiment (see FIG. 10), the outer band 74 may be angled inward as it extends rearward. In various embodiments (see FIGS. 7-11, 14-16), the outer band 74 may have a substantially flat outer surface. In other embodiments, the outer band 74 may be formed from corrugated material 76, such as the material shown in FIG. 17, with a plurality of corrugations 78 wherein the corrugations 78 align with the longitudinal axis of the nacelle 24. In at least one embodiment (see FIG. 12), the corrugations 78, or similar ripples, may be oriented transverse to the longitudinal axis of the nacelle 24.

The outer band 74 may also include an inner structure 80. In various embodiments (see FIGS. 7-8, 14, 16), the structure 80 may include a plurality of cells 82. The cells 82 may include a variety of cross-sectional shapes, such as triangular, trapezoidal, rectangular, etc. The cells 82 may be positioned within the outer band 74, such that the cells 82 are substantially aligned from the forward section to the aft section of the outer band 74. In at least one embodiment (see FIG. 15), the cells 82 may form a stressed skin sandwich.

The aft end of the torque beam 20 may couple with the aft end of the fan case 38 and the fan ramp 48. In various embodiments, the fan ramp 48 may be integrally formed with one or more portions of the torque beam 20. When the thrust reverser 10 is stowed, the cascades 16 may be positioned over (or radially outward from) and parallel to the outer band 74. The torque beam ring 72 may also include a plurality of holes 84 cut in the ring 72 to allow the actuators 22 to access the translating sleeve 14.

The actuators 22 generally drive and hold the translating sleeve 14 rearward during deployment of the thrust reverser 10. Each actuator 22 may include a drive element 86, an actuator arm 88, and an actuator rod 90. The drive element 86 may employ one or more drive sources, such as electrical components, including electric motors, hydraulic components, or pneumatic components. The actuator arm 88 and the actuator rod 90 are elongated and cylindrical with the actuator rod 90 being positioned within the actuator arm 88. The drive element 86 is coupled to both the actuator arm 88 and the actuator rod 90 and may extend the actuator rod 90 from the actuator arm 88 during thrust reverser 10 deployment and retract the rod 90 into the arm 88 during thrust reverser 10 stowage. The drive element 86 may be positioned or mounted at the forward end of the torque beam 20 with the actuator arm 88 extending through one of the holes 84 in the torque beam ring 72 toward the rear of the nacelle 24. The actuator arm 88 may be located between two cascades 16 and positioned generally at the same height as the cascades 16. The actuator rod 90 couples with an actuator fitting 92 at the forward edge of the translating sleeve 14.

Figure 2:
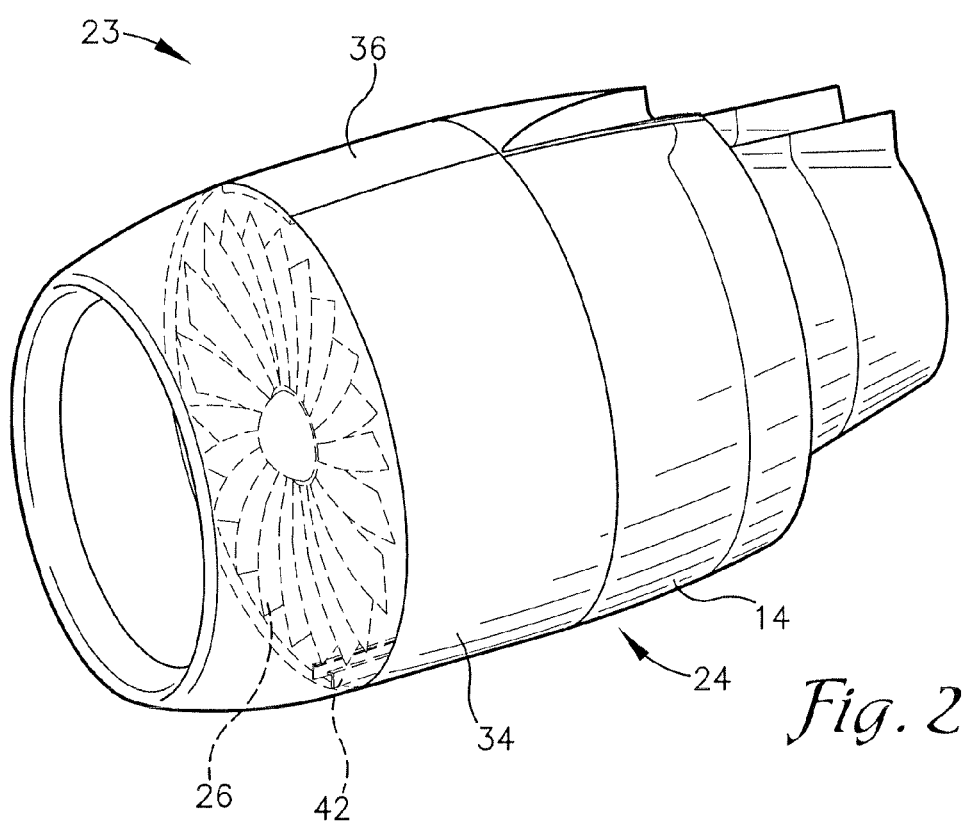
FIG. 2 is a perspective view of an aircraft engine with the thrust reverser in the stowed position.

The thrust reverser 10 may perform as follows. With the thrust reverser 10 in the stowed position, the translating sleeve 14 is in its forward most position, as seen in FIGS. 2, 5, and 7. The forward edge of the translating sleeve 14 abuts the aft edge of the fan cowl 34, such that there is a substantially smooth line along the length of the outer surface of the nacelle 24. The forward support ring 60 is in close proximity to the torque beam ring 72. The cascades 16 are positioned between the flat band 74 of the torque beam 20 and the inner surface of the fan cowl 34. There is a path for air to flow from the intake fan 26 in the aft direction through the fan duct 66 and out through the rear of the nacelle 24. With the thrust reverser 10 stowed, there is a smooth path through the fan duct 66 where the inner surface of the translating sleeve 14 and the base of the blocker doors 18 abut the fan ramp 48 and form a tight seal therebetween.

When the thrust reverser 10 deploys, the drive elements 80 of the actuators 22 receive an activation signal and the actuator rods 84 extend from the actuator arms 82. The rods 84 drive the translating sleeve 14 and the blocker doors 18 rearward. The upper sliders 62 and the lower sliders 64, being coupled to the translating sleeve 14, slide rearward along the upper slider tracks 44 and the lower slider tracks 46. As the blocker doors 18 move rearward, the blocker door drag links 68 pull the blocker doors 18 inward toward the inner wall 28. As the translating sleeve 14 moves rearward, so do the cascades 16 translate from the cavity to fill the gap being created between the fan cowl 34 and the forward edge of the retreating translating sleeve 14. Air flow from the fan 26 is starting to divert from the fan duct 66 and through the cascades 16.

When the thrust reverser 10 is fully deployed, as seen in FIGS. 3, 4, 6, and 8, the actuator rods 84 are fully extended and the translating sleeve 14 and the cascades 16 are at their rearmost position. The blocker doors 18 have been pulled down such that the aft edge of each blocker door 18 abuts the inner wall 28 such that air flow from the intake fan 26 is blocked from its path down the fan duct 66. The air flow is diverted outward through the cascades 16. The fan ramp 48 serves to provide an aerodynamic path to the air flow through the cascades 16. The structure of the cascades 16 also directs the air flow forward with respect to the engine 23, thus providing reverse thrust. However, reverse thrust air flow does not feed back into the space between the fan cowl 34 and the fan case 38, because the torque beam 20 provides a barrier to air flow in that direction.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

Having thus described various embodiments of the invention, what is claimed as new and desired to be protected by Letters Patent includes the following:

1. A thrust reverser for use with an aircraft nacelle, the thrust reverser comprising:
    a sleeve positioned at a rear of the aircraft nacelle and configured to translate rearward during thrust reverser deployment;
    a fan ramp positioned within the aircraft nacelle including an arcuate outward flare configured to provide an aerodynamic path to the airflow during thrust reverser deployment;
    a torque beam positioned within the aircraft nacelle including a radial ring extending inward from a fan cowl and a circumferential outer band axially extending from the radial ring to form a cavity between the circumferential outer band and the fan cowl and the torque beam configured to limit airflow into the aircraft nacelle during thrust reverser deployment;
    a plurality of cascades positioned radially outward of the circumferential outer band around the circumference of the torque beam during thrust reverser stowage and configured to translate from the cavity to direct air flow forward during thrust reverser deployment; and
    a plurality of blocker doors positioned in alignment with the plurality of cascades and configured to direct airflow through the plurality of cascades during thrust reverser deployment.

2. The thrust reverser of claim 1, wherein the plurality of cascades are coupled to the sleeve and translate rearward during thrust reverser deployment.

3. The thrust reverser of claim 1, wherein the plurality of cascades cover a gap formed between the sleeve and a fixed portion of the aircraft nacelle during thrust reverser deployment.

4. The thrust reverser of claim 1, wherein the plurality of blocker doors lie flat against an inner surface of the sleeve during thrust reverser stowage and are pulled inward to contact an aircraft engine during thrust reverser deployment.

5. The thrust reverser of claim 1, further including a plurality of actuators that couple to the forward edge of the sleeve and are configured to translate the sleeve rearward during thrust reverser deployment.

6. The thrust reverser of claim 5, wherein each actuator includes a drive element coupled to the forward edge of the torque beam, an arm that extends the length of the torque beam, and a rod that is coupled to the forward edge of the sleeve.

7. The thrust reverser of claim 1, further including a plurality of blocker door drag links that couple the plurality of blocker doors to the exterior surface of an aircraft engine and pull the blocker doors inward during thrust reverser deployment.

8. The thrust reverser of claim 1, wherein the circumferential outer band includes a multicell internal structure.

9. A thrust reverser for use with an aircraft nacelle, the thrust reverser comprising:
- a sleeve positioned at a rear of the aircraft nacelle and configured to translate rearward during thrust reverser deployment;
- a plurality of actuators coupled to the forward edge of the sleeve and configured to translate the sleeve rearward during thrust reverser deployment;
- a fan ramp positioned within the aircraft nacelle including an arcuate outward flare configured to provide an aerodynamic path to the airflow during thrust reverser deployment;
- a torque beam positioned within the aircraft nacelle and including a radial ring extending inward from a fan cowl and a circumferential outer band axially extending from the radial ring to form a cavity between the circumferential outer band and the fan cowl, the torque beam configured to limit airflow into the aircraft nacelle during thrust reverser deployment;
- a plurality of cascades positioned radially outward of the circumferential outer band and configured to translate from the cavity to direct air flow forward during thrust reverser deployment; and
- a plurality of blocker doors positioned in alignment with the plurality of cascades and configured to direct airflow through the plurality of cascades during thrust reverser deployment.

10. The thrust reverser of claim 9, wherein each actuator includes a drive element coupled to the forward edge of the torque beam, an arm that extends the length of the torque beam, and a rod that is coupled to the forward edge of the sleeve.

11. The thrust reverser of claim 9, further including a plurality of blocker door drag links that couple the plurality of blocker doors to the exterior surface of an aircraft engine and pull the blocker doors inward during thrust reverser deployment.

12. The thrust reverser of claim 9, wherein the plurality of cascades are coupled to the sleeve and translate rearward during thrust reverser deployment.

13. The thrust reverser of claim 9, wherein the plurality of cascades cover a gap formed between the sleeve and a fixed portion of the aircraft nacelle during thrust reverser deployment.

14. The thrust reverser of claim 9, wherein the plurality of blocker doors lie flat against an inner surface of the sleeve during thrust reverser stowage and are pulled inward to contact an aircraft engine during thrust reverser deployment.

15. The thrust reverser of claim 9, wherein the circumferential outer band includes a multicell internal structure.

16. An aircraft nacelle comprising:
- a fan case arcuate in shape and positioned to surround an aircraft engine intake fan;
- a fan cowl arcuate in shape and positioned to surround the fan case, the fan cowl presenting an outer surface;
- a support structure positioned within a portion of the circumference of the fan cowl and coupled to the fan cowl; and
- a thrust reverser, including
  - a sleeve positioned to a rear of the fan cowl and including an outer surface that aligns with the outer surface of the fan cowl, the sleeve configured to translate rearward during thrust reverser deployment,
  - a torque beam positioned between the fan cowl and the fan case, including a radial ring extending inward from the fan cowl and a circumferential outer band axially extending from the radial ring to form a cavity between the circumferential outer band and the fan cowl and the torque beam configured to limit airflow into the aircraft nacelle during thrust reverser deployment,
  - a plurality of cascades positioned radially outward of the circumferential outer band during thrust reverser stowage and configured to translate from the cavity to direct air flow forward during thrust reverser deployment,
  - an outwardly flaring fan ramp positioned radially inward and rearward from the torque beam and configured to provide an aerodynamic path to the airflow through the plurality of cascades during thrust reverser deployment, and
  - a plurality of blocker doors positioned in alignment with the plurality of cascades and configured to direct airflow through the plurality of cascades during thrust reverser deployment.

17. The aircraft nacelle of claim 16, wherein the plurality of cascades are coupled to the sleeve and translate rearward during thrust reverser deployment.

18. The aircraft nacelle of claim 16, wherein the plurality of cascades cover a gap formed between the sleeve and a fixed portion of the aircraft nacelle during thrust reverser deployment.

19. The aircraft nacelle of claim 16, wherein the plurality of blocker doors lie flat against an inner surface of the sleeve during thrust reverser stowage and are pulled inward to contact an aircraft engine during thrust reverser deployment.

20. The aircraft nacelle of claim 16, further including a plurality of actuators that couple to the forward edge of the sleeve and are configured to translate the sleeve rearward during thrust reverser deployment.

21. The aircraft nacelle of claim 20, wherein each actuator includes a drive element coupled to the forward edge of the torque beam, an arm that extends the length of the torque beam, and a rod that is coupled to the forward edge of the sleeve.

22. The aircraft nacelle of claim 16, further including a plurality of blocker door drag links that couple the plurality of blocker doors to the exterior surface of an aircraft engine and pull the blocker doors inward during thrust reverser deployment.

23. An assembly for a thrust reverser for use with an aircraft nacelle, the assembly comprising:
- a sleeve positioned at a rear of the aircraft nacelle and configured to translate rearward during thrust reverser deployment; and
- a fan ramp positioned within the aircraft nacelle including an arcuate outward flare configured to provide an aerodynamic path to the airflow during thrust reverser deployment;
- a torque beam positioned forward of the fan ramp within the aircraft nacelle including a radial ring extending inward from the fan cowl and a circumferential outer band axially extending from the radial ring to form a cavity between the circumferential outer band and a fan cowl and the torque beam configured to limit airflow into the aircraft nacelle during thrust reverser deployment; and
- a plurality of cascades positioned radially outward of the circumferential outer band during thrust reverser stowage and configured to translate from the cavity to direct air flow forward during thrust reverser deployment.

24. The assembly of claim 23, further including
- a plurality of blocker doors positioned in alignment with the plurality of cascades and configured to direct airflow through the plurality of cascades during thrust reverser deployment.

* * * * *